United States Patent [19]

Cykana et al.

[11] Patent Number: 5,756,030
[45] Date of Patent: May 26, 1998

[54] METHOD AND APPARATUS FOR EXTRUDING A ROD OF HOMOGENEOUS PLASTIC MATERIAL

[75] Inventors: Daniel Cykana; Steven F. Schick, both of Sheboygan, Wis.

[73] Assignee: Bemis Manufacturing Company, Sheboygan Falls, Wis.

[21] Appl. No.: 639,081

[22] Filed: Apr. 24, 1996

Related U.S. Application Data

[63] Continuation-in-part of Ser. No. 428,504, Apr. 24, 1995, abandoned.

[51] Int. Cl.$^6$ ........................................ B29C 47/88
[52] U.S. Cl. .................... 264/171.13; 156/244.12; 264/173.17; 264/171.23; 264/178 R; 264/237; 264/323; 425/71; 425/325; 425/379.1; 425/516
[58] Field of Search .................. 264/171.13, 173.17, 264/171.23, 171.24, 178 R, 178 F, 173.18, 237, 348, 323; 425/71, 325, 516, 378.1, 379.1; 156/244.12

[56] References Cited

U.S. PATENT DOCUMENTS

| | | | |
|---|---|---|---|
| 2,736,897 | 2/1956 | Parsons | 156/244.12 |
| 2,932,323 | 4/1960 | Aries | 156/244.12 |
| 3,189,941 | 6/1965 | Reifenhauser | 425/133.1 |
| 3,217,074 | 11/1965 | Gould et al. | 264/210.5 |
| 3,440,129 | 4/1969 | Anselm | 156/244.12 |
| 3,532,783 | 10/1970 | Pusey et al. | 264/237 |
| 3,825,641 | 7/1974 | Barnett | 264/237 |
| 3,849,192 | 11/1974 | Schmidt | 264/171.14 |
| 3,857,914 | 12/1974 | Aishima et al. | 264/45.5 |
| 3,956,438 | 5/1976 | Schippers | 264/46.1 |
| 3,983,195 | 9/1976 | Arons et al. | 264/171.11 |
| 4,100,243 | 7/1978 | Wissinger et al. | 264/177.19 |
| 4,101,628 | 7/1978 | Wiik | 264/325 |
| 4,154,893 | 5/1979 | Goldman | 428/375 |
| 4,187,270 | 2/1980 | Bartrum | 264/173.17 |
| 4,451,306 | 5/1984 | Verne | 264/171.13 |
| 4,680,156 | 7/1987 | Collier | 264/210.5 |
| 4,704,244 | 11/1987 | Back | 264/566 |
| 4,734,240 | 3/1988 | Chung et al. | 264/210.5 |
| 4,770,834 | 9/1988 | Nakasone et al. | 264/171.24 |
| 4,943,463 | 7/1990 | Back | 428/44 |
| 4,952,348 | 8/1990 | Ishimaru et al. | 264/40.6 |

FOREIGN PATENT DOCUMENTS

| | | | |
|---|---|---|---|
| 0068714 | 1/1983 | European Pat. Off. | 264/178 R |
| 56-144126 | 11/1981 | Japan | 264/171.13 |

OTHER PUBLICATIONS

Clear ISOPLAST Resins –When other high–performance clear resins go to pieces, ISOPLAST goes to work. (Dow Plastics Form No. 306–00349–991SAI(No date).

*Primary Examiner*—Jeffery R. Thurlow
*Attorney, Agent, or Firm*—Michael Best & Friedrich LLP

[57] ABSTRACT

A method of extruding a homogeneous plastic rod substantially free of shrink voids, the method having the steps of: extruding a rod central portion of plastic material having a glass transition point and a Vicat softening point below the glass transition point, the rod central portion having a center core and an outer skin; cooling the rod central portion while maintaining the outer skin above the Vicat softening point until the center core is cooled to approximately the Vicat softening point; using an extruder to extrude around the rod central portion a sheath of the same plastic material, the sheath having an outer skin and inner and outer portions, such that the rod central portion acts as a heat sink for the inner portion of the sheath, and such that, at the extruder, the plastic material forming the outer skin of the rod central portion is melted upon contact with the plastic material forming the sheath and the plastic material of the rod central portion and the plastic material of the sheath form the homogeneous rod, and such that the plastic material forming the center core of the rod central portion remains at a temperature below the glass transition point; and cooling the sheath while maintaining the outer skin of the sheath above said Vicat softening point until the inner portion is cooled to approximately the Vicat softening point.

10 Claims, 1 Drawing Sheet

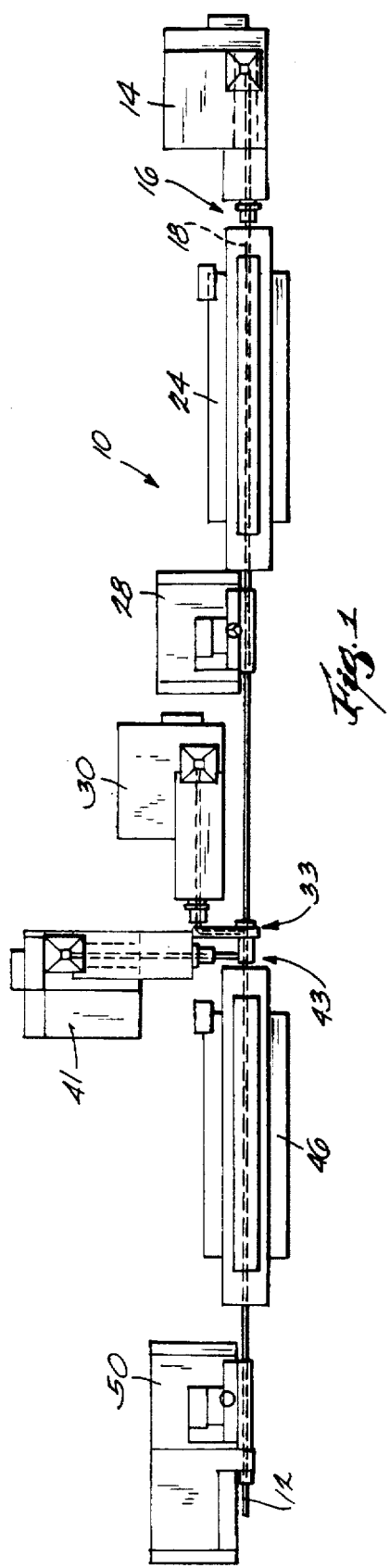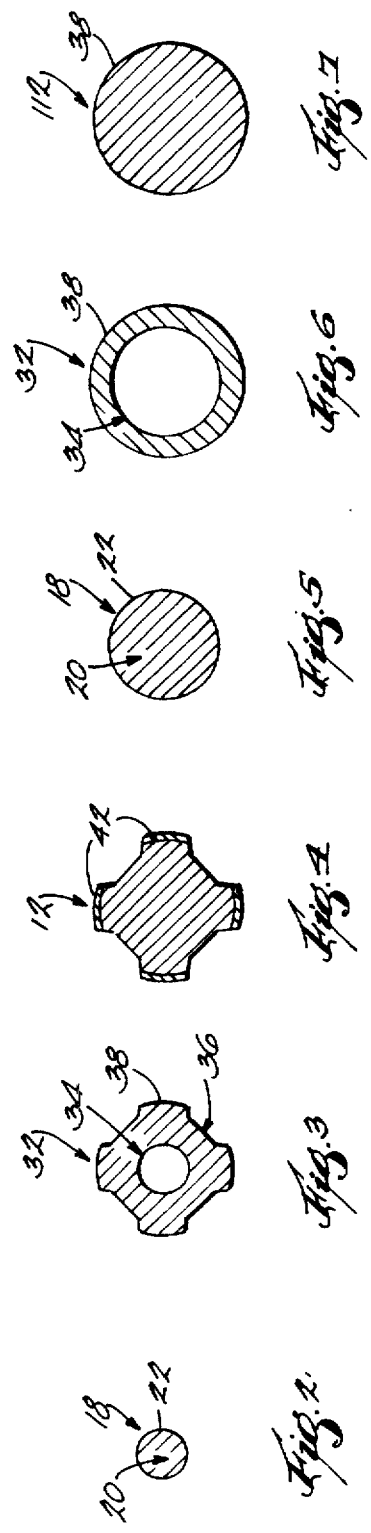

METHOD AND APPARATUS FOR EXTRUDING A ROD OF HOMOGENEOUS PLASTIC MATERIAL

This application is a continuation-in-part of U.S. application Ser. No. 08/428,504 filed Apr. 24, 1995, now abandoned, entitled "Method and Apparatus for Extruding a Rod of Homogeneous Plastic Material", which is incorporated herein by reference.

BACKGROUND OF THE INVENTION

1. Field of the Invention

The invention relates to rods which are extruded of plastic material. More particularly, the invention relates to an apparatus and method for extruding a rod of homogeneous plastic material.

2. Description of Prior Art

Homogeneous plastic rods ordinarily are extruded in one piece in a process including a single extrusion step followed by a single cooling step. As used herein, "plastic" material includes thermoplastic and thermosetting materials. When extruding rods of large cross sectional dimensions, it has been difficult to avoid the formation of shrink voids in the plastic material. As used herein, "shrink voids" refers to voids which can form in a plastic material due to differential rates of shrinkage or cooling of the plastic material. In order to avoid shrink voids, it has usually been necessary to extrude and cool large rods at much lower production rates than small rods.

SUMMARY OF THE INVENTION

The invention provides an apparatus and method for extruding a large, homogeneous plastic rod which is substantially free of shrink voids and which is therefore structurally sound and aesthetically pleasing.

The invention also provides an apparatus and method for extruding at high production rates a rod which is substantially free of shrink voids.

More particularly, the invention provides an apparatus which includes a first extruder for extruding a rod central portion from plastic material. The apparatus includes a first cooling and sizing apparatus or mechanism downstream of the first extruder for cooling the rod central portion. In one embodiment, the cooling and sizing mechanism includes a water bath which is maintained slightly below the Vicat softening point of the plastic material. Immersion in the water bath initially cools the center core of the rod central portion to about the Vicat softening point of the plastic material while maintaining the outer skin at or above the Vicat softening point. Eventually the entire rod central portion is cooled below the Vicat softening point. The rod central portion being thus cooled is substantially free of shrink voids.

The apparatus includes a second extruder for extruding an endless sheath around the rod central portion. The sheath consists of plastic material which is identical to the plastic material forming the rod central portion. The sheath is extruded at a temperature sufficient to melt the outer skin of the central portion so that the sheath and the central portion "flow together" and become homogeneous. A second cooling and sizing apparatus or mechanism is located downstream of the second extruder. The cooling and sizing mechanism includes a water bath at a temperature below the Vicat softening point. The rod central portion acts as a heat sink that absorbs heat from the inner portion of the sheath, while the water bath cools the outer portion of the sheath. In this way, the inner portion is cooled to approximately the Vicat softening point, while the outer skin remains at or above the Vicat softening point. Thereafter the entire rod (the central portion and the core) is cooled below the Vicat softening point. The rod being thus formed consists of homogeneous plastic material which is substantially free of shrink voids.

Objects and advantages other than those set forth above will become apparent to those skilled in the art upon review of the following detailed description, drawings and claims.

BRIEF DESCRIPTION OF THE DRAWINGS

FIG. 1 is a schematic illustration of an apparatus embodying the invention.

FIG. 2 is a cross sectional view of a rod central portion extruded by the apparatus.

FIG. 3 is a cross sectional view of a sheath extruded by the apparatus.

FIG. 4 is a cross sectional view of the combined central portion and sheath.

FIG. 5 is a cross sectional view of another rod central portion extruded by an apparatus in a second embodiment of the invention.

FIG. 6 is a cross sectional view of the sheath in the second embodiment of the invention.

FIG. 7 is a cross sectional view of the combined central portion and sheath in the second embodiment of the invention.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF A PREFERRED EMBODIMENT

Illustrated in FIG. 1 is an apparatus 10 for extruding a homogeneous plastic rod 12 which is substantially free of shrink voids. In the illustrated embodiment, the rod 12 (FIG. 4) is in the form of stock which is particularly adapted for use as screwdriver handles. In other embodiments, the rod can be adapted for different uses and thus can have any other suitable cross sectional configuration.

The apparatus 10 includes (FIG. 1) a first extruder 14 for extruding a rod central portion 18 (FIGS. 1 and 2) from plastic material. The plastic material may be any suitable thermoplastic material, thermosetting material or mixture of thermoplastic and thermosetting materials, which has a glass transition point and which has a Vicat softening point below the glass transition point. As used herein, "glass transition point" means the approximate midpoint of the temperature range over which an amorphous material such as a plastic material changes from a brittle vitreous state or condition to a plastic or viscous condition. As used herein, "Vicat softening point" means the temperature at which an amorphous material such as a plastic material initially softens from the brittle vitreous state, as determined by testing the material according to ASTM standard test method D 1525 by inserting a flat-headed needle therein under a specified load. It is believed that at temperatures above the glass transition point, segmental motions of the polymer backbone chain can occur, and the plastic material can be permanently stretched and configured. It is believed that at temperatures below the glass transition point but above the Vicat softening point, the polymer backbone chain cannot undergo significant segmental motion, and thus the plastic material cannot be permanently stretched and configured, although a limited amount of intermolecular movement and bonding can occur.

In the specific embodiment illustrated, the plastic material is Isoplast™ 301. Isoplast™ 301 is a commercially available resin material sold by The Dow Chemical Company, Midland, Mich. The Vicat softening point of Isoplast™ 301 is 228° F. The glass transition point of Isoplast™ 301 is in the range of 230°–233° F. Thus, the Vicat softening point of Isoplast™ 301 is below the glass transition point of Isoplast™ 301. In other embodiments (not shown), the invention can be practiced with another suitable plastic material.

The extruder 14 includes means (not shown) for heating and thus forming a melt of the plastic material. The extruder 14 also includes (see FIG. 1) a die 16 which forms the plastic material into the cross sectional shape of the rod central portion 18.

As shown in FIG. 2, the rod central portion 18 has a center core 20 and an outer surface or skin 22. In the illustrated embodiment, the rod central portion 18 has a circular cross sectional shape and is at a temperature of about 400°–420° F. upon exiting the extruder 14.

The apparatus 10 also includes (see FIG. 1) a first cooling and sizing apparatus or mechanism 24 downstream of the first extruder 14, and a pulling apparatus 28 for pulling the rod central portion 18 through the cooling and sizing mechanism 24. In the illustrated embodiment, the cooling and sizing mechanism 24 includes a water bath which is maintained slightly below the Vicat softening point of the plastic material. In the illustrated embodiment, the water bath is maintained at about 170°–200° F. A suitable commercially available cooling and sizing mechanism is a PVS tank sizing system, sold by RDN Manufacturing, Wood Dale, Ill. In another embodiment (not shown), another suitable cooling mechanism can be employed for cooling the rod central portion 18.

Immersion in the water bath initially cools the center core 20 of the rod central portion 18 to about the Vicat softening point of the plastic material while maintaining the outer skin 22 at or above the Vicat softening point. In the illustrated embodiment, immersion in the water bath thus initially cools the center core 20 of the rod central portion 18 to about 228° F., the Vicat softening point of the Isoplast™ 301, while maintaining the outer skin 22 at or above the Vicat softening point. The rod central portion 18 is eventually cooled to below the Vicat softening point of the plastic material. In the illustrated embodiment, the rod central portion 18 is cooled to about 140° F. after exiting the water bath. The rod central portion 18 being thus cooled is substantially free of shrink voids. As used herein, "substantially free of shrink voids" means that shrink voids either are non-existent or are not visible in clear plastic material, are not visible in opaque plastic material at the outer surface of the rod, are not visible in the plastic material when the rod is viewed in cross section, or are not present to an extent which substantially impairs the structural strength of the rod 12.

The apparatus 10 also includes (see FIG. 1) a second extruder 30 for extruding an endless sheath 32 (FIG. 3) around the rod central portion 18. The sheath 32 consists of plastic material which is identical to the plastic material forming the rod central portion 18. Except as described below, the extruder 30 is identical to the extruder 14. The extruder 30 includes a crosshead die 33 for forming or coextruding the sheath 32 around the rod central portion 18. Any suitable crosshead die may be employed. The crosshead die 33 includes a central passage (not shown) through which the rod central portion 18 passes and an outer die passage (not shown) which forms the plastic material into the cross sectional configuration of the sheath 32. As shown in FIG. 3, the sheath 32 includes an inner portion 34 adjacent the rod central portion 18 and an outer portion 36 surrounding the inner portion 34. An outer skin 38 surrounds the outer portion 36 and forms an outer surface of the sheath 32. At the extruder 30, the plastic material forming the outer skin of the rod central portion 18 is melted upon contact with the hot plastic material forming the sheath 32, such that the plastic material of the rod central portion 18 and the plastic material of the sheath 32 form the homogeneous rod 12, as shown in FIG. 4 and as further described below. In the specific embodiment illustrated, the sheath 32 is at a temperature of about 400°–420° F. upon exiting the extruder 30.

The apparatus 10 includes (FIG. 1) a third extruder 41 downstream of the extruder 30 for extruding around the sheath 32 an outer layer 42 (FIG. 4) of cap stock. The cap stock ordinarily consists of plastic material which is different from the plastic material forming the rod central portion 18 and the sheath 32. In the illustrated embodiment, in which the rod 12 is used to make screwdriver handles, the cap stock consists of a suitable grippable material, such as urethane. In different embodiments, the rod may not include cap stock. Except as described below, the extruder 41 is identical to the extruder 30. The extruder 41 includes a crosshead die 43 which forms or coextrudes the cap stock layer 42 around the sheath 32. The crosshead die 43 includes a central passage (not shown) through which the rod 12 passes and an outer die passage (not shown) which forms the cap stock into the cross section shape of the outer layer 42.

The apparatus 10 also includes (FIG. 1) a second cooling and sizing apparatus or mechanism 46 downstream of the extruder 41, and a pulling and cutoff apparatus 50 for pulling the rod 12 through the cooling and sizing mechanism 46 and for thereafter cutting the rod 12 into discrete lengths. Any suitable pulling and cutoff apparatus can be employed. Except as otherwise described, the cooling and sizing mechanism 46 is identical to the cooling and sizing mechanism 24. More particularly, in the illustrated embodiment, the cooling and sizing mechanism 46 includes a water bath which is maintained slightly below the Vicat softening point of the plastic material. In the illustrated embodiment, the water bath of the cooling and sizing apparatus 46 preferably is maintained at about 140°–150° F.

After the central portion 18 and the sheath 32 exit the extruder 30, the rod central portion 18 acts as a heat sink and absorbs heat from the inner portion 34 of the sheath 32. The mass of the rod central portion 18 is sufficiently large in relation to the mass of the sheath 32 that the temperature of the center core 20 of the rod central portion 18 remains below the glass transition point of the plastic material, such that the rod central portion 18 is not permanently stretched or deformed when pulled. While the rod central portion 18 is absorbing heat from the inner portion of the sheath, the water bath absorbs heat from the outer portion 36 of the sheath 32. Contact with the water bath and with the rod central portion 18 initially cools the sheath 32 until the inner portion 34 is cooled to approximately the Vicat softening point, while the outer skin 38 remains at or above the Vicat softening point. The entire rod 12 is eventually cooled to below the Vicat softening point. In the illustrated embodiment, the temperature of the rod central portion 18 upon exiting the water bath is about 160° F., and the temperature of the sheath outer skin 38 is at or slightly higher than the temperature of the water bath. The rod 12 being thus cooled is substantially free of shrink voids.

As mentioned above, the cooled rod 12 is homogeneous, i.e., the plastic material forming the rod central portion 18 is homogeneous with the plastic material forming the sheath 32. As used herein, "homogeneous" means that the plastic material forming the rod central portion 18 is identical to and integral with the plastic material forming the sheath 32. As previously stated, a portion of the plastic material forming the rod central portion 18 melts upon contact with the hot plastic material forming the sheath 32. Further, upon cooling the plastic material forming the rod central portion 18 and the sheath 32 solidifies in a manner forming a unitary or integral structure. Preferably, the resulting integral structure does not include a visible line of demarcation between the rod central portion 18 and the sheath 32. In other embodiments of the invention, wherein thermosetting material is used, the thermosetting material forming the rod central portion may not melt and crystallize with the material forming the sheath, and the resulting structure thus may have a visible line of demarcation.

The rod 12, being homogeneous and free of shrink voids, is aesthetically pleasing and is resistant to breakage and chipping. The rod 12 can be extruded at high production rates in a continuous process with a minimal requirement for manual labor. For example, the rod 12 can be extruded at a production rate which is about 50% greater than the production rate of a rod of identical size and configuration which is substantially free of shrink voids and which is extruded in a single extrusion step.

Illustrated in FIGS. 5–7 is a rod 112 which is extruded in an alternative embodiment of the invention. Except as otherwise described, the rod 112 is identical to the rod 12, and similar elements are identified by the same reference numbers. The rod 112 includes a rod central portion 18 (FIG. 5) and a sheath 32 (FIG. 6). Unlike the rod 12, the rod 112 (FIG. 7) has a circular cross sectional shape. In the particular embodiment illustrated, the cross sectional area of the rod central portion 18 is substantially equal to the cross sectional area of the sheath 32. In other embodiments, the relative cross sectional areas of the rod central portion and the sheath may be different. The rod 112 does not include an outer layer of cap stock.

Various features of the invention are set forth in the following claims.

What is claimed is:

1. A method of extruding a homogeneous plastic rod substantially free of shrink voids, said method comprising the steps of:

(a) extruding a rod central portion of plastic material having a glass transition point and a Vicat softening point below the glass transition point, the rod central portion having a center core and an outer skin;

(b) cooling the rod central portion while maintaining the outer skin at or above the Vicat softening point until the center core is cooled to approximately the Vicat softening point;

(c) further cooling the rod central portion until the entire rod central portion is below the glass transition point;

(d) using an extruder to extrude around the rod central portion a sheath of the same plastic material, the sheath having an outer skin and inner and outer portions, such that the rod central portion acts as a heat sink for the inner portion of the sheath, and such that, at the extruder, the plastic material forming the outer skin of the rod central portion is melted upon contact with the plastic material forming the sheath and the plastic material of the rod central portion and the plastic material of the sheath form the homogeneous rod, and such that the plastic material forming the center core of the rod central portion remains at a temperature below the glass transition point; and (e) cooling the sheath while maintaining the outer skin of the sheath above the Vicat softening point until the inner portion is cooled to approximately the Vicat softening point.

2. A method as set forth in claim 1 wherein the rod central portion has a cross sectional area, and wherein the sheath has a cross sectional area substantially equal to the cross sectional area of the rod central portion.

3. A method as set forth in claim 1 and further comprising the step of (f) extruding cap stock around the sheath.

4. A method as set forth in claim 3 wherein said cap stock extruding step (f) is prior to said second cooling step (e).

5. Apparatus for extruding a homogeneous plastic rod substantially free of shrink voids, said apparatus comprising:

a first extruder for extruding a rod central portion of plastic material, the rod central portion having a center core and an outer skin;

a first cooling mechanism downstream of said first extruder for cooling the center core while maintaining the outer skin at or above the Vicat softening point of the plastic material until the center core is cooled to approximately the Vicat softening point;

a second extruder downstream of said first cooling mechanism for extruding around the rod central portion a sheath of the same plastic material, the sheath having inner and outer portions, such that the rod central portion acts as a heat sink for the inner portion of the sheath, and such that, at said second extruder, the plastic material forming the outer skin of the rod central portion is melted upon contact with the plastic material forming the sheath and the plastic material of the rod central portion and the plastic material of the sheath form the homogeneous rod, and such that the plastic material forming the center core of the rod central portion remains at a temperature below the glass transition point; and a second cooling mechanism downstream of said second extruder for cooling the outer portion of the sheath while maintaining the outer skin of the sheath above the Vicat softening point of the material until the inner portion of the sheath is cooled to approximately the Vicat softening point.

6. Apparatus as set forth in claim 5 and further comprising a third extruder downstream of said second extruder for extruding cap stock around the sheath.

7. Apparatus as set forth in claim 5 wherein said second cooling mechanism is downstream of said third extruder.

8. Apparatus as set forth in claim 5 wherein the rod central portion has a cross sectional area, and wherein the sheath has a cross sectional area substantially equal to the cross sectional area of the rod central portion.

9. A method as set forth in claim 1, wherein said further cooling step (c) comprises cooling the entire rod central portion to substantially below the Vicat softening point.

10. A method as set forth in claim 9, wherein said further cooling step (c) comprises cooling the entire rod central portion to about 60 to 90 degrees F. below the glass transition temperature.

* * * * *